United States Patent [19]

Platet et al.

[11] 3,987,248
[45] Oct. 19, 1976

[54] DIGITAL MULTIPLEXING SYSTEM

[75] Inventors: Frédéric M. Platet; Yvon N. Madec; Patrick E. Boutmy, all of Lannion, France

[73] Assignees: Etat Francais (Ministry of Posts and Telecommunications — Centre National, Etc.), Issy-les-Moulineaus; Societe Anonyme de Telecommunications, Paris, both of France

[22] Filed: Nov. 25, 1974

[21] Appl. No.: 527,176

[30] Foreign Application Priority Data
Nov. 27, 1973 France .................................. 73.42229

[52] U.S. Cl. ............................. 179/15 AF; 179/15 AT
[51] Int. Cl.² ................................................. H04J 3/02
[58] Field of Search ........ 179/15 AF, 15 BA, 15 AT

[56] References Cited
UNITED STATES PATENTS

| | | | |
|---|---|---|---|
| 3,136,861 | 6/1964 | Mayo .............................. | 179/15 AF |
| 3,461,245 | 8/1969 | Johannes et al. ................ | 179/15 AF |
| 3,504,287 | 3/1970 | Deregnaucourt ............... | 179/15 BA |
| 3,569,631 | 3/1971 | Johannes et al. ................ | 179/15 AF |
| 3,742,145 | 6/1973 | Clark et al ...................... | 179/15 BA |
| 3,821,478 | 6/1974 | Hillman .......................... | 179/15 AF |
| 3,873,773 | 3/1975 | Guy ................................. | 179/15 BA |

OTHER PUBLICATIONS
"Multiplexing of Asynchronous . . . " by V. I. Johannes et al., IEEE Trans. on Comm. Tech., vol. Com–14, No. 5, pp. 562–568.
"Developments in Data Comm.," by Williams, Post Off. Elec. Eng. Journal, July 1971, vol. 64, No. 2, pp. 70–80.

Primary Examiner—Douglas W. Olms
Attorney, Agent, or Firm—Abraham A. Saffitz

[57] ABSTRACT

In the field of digital data multiplexing systems, the master rates assigned to the different channels are defined by the national Telecommunications Authorities. It may and actually does happen that the master rates differ in different countries. A direct bit per bit multiplexing system from a first low master rate to a second high master rate is proposed which allows demultiplexing the high-rate digital signal into intermediate-rate signals. The number of the synchro and stuffing bits in the high-rate signal and intermediate-rate signals being known, only the low-rate signals are stuffed in dependence upon the difference between their own timing and the local timing at the multiplexing station. Blank intervals are provided in the low-rate signals having the duration of the synchro and stuffing bits in the intermediate-rate signals divided by the intermediate-to-low rate ratio and blank intervals are provided in the intermediate-rate signals having the duration of the synchro and stuffing bits in the high-rate signal divided by the high-to-intermediate rate ratio. Synchro and stuffing bits are inserted in the intervals resulting from the bit per bit multiplexing of the blank intervals.

2 Claims, 9 Drawing Figures

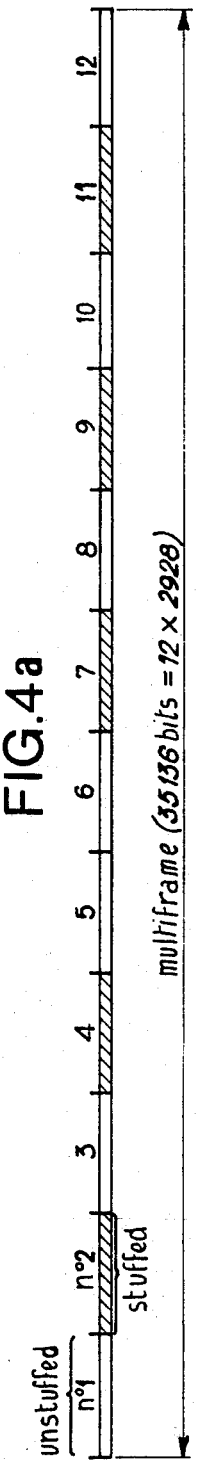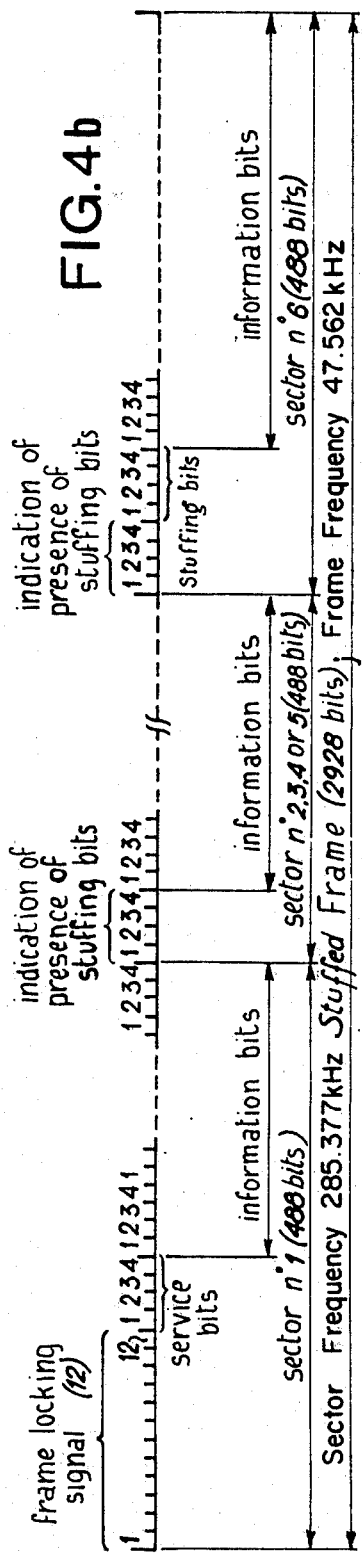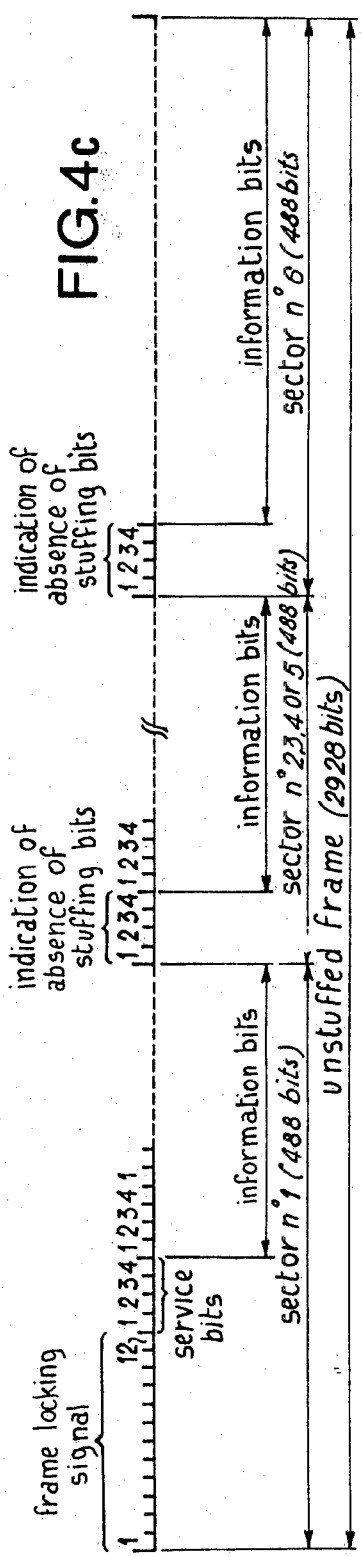

DIGITAL MULTIPLEXING SYSTEM

BACKGROUND OF THE INVENTION

1. Field of Invention

This invention relates to a digital multiplexing system.

2. Description of the Prior Art a. PULSE STUFFING SYNCHRONIZATION

Digital multiplexing is a concept known in the prior art and has been described, for instance, in paper entitled "Experimental 224 Mb/s digital multiplexer-demultiplexer using pulse stuffing synchronization" by F. J. WITT in the "Bell System Technical Journal," November 1965, pages 1843–1885 and in paper entitled "Digital multiplexing systems" by Yvon MADEC in "Echo des Recherches," January 1973, pages 59–67. Digital multiplexing systems provide multiplexing by the time slotting of component digital signals of one rate into a single resulting digital signal of a higher rate. Digital demultiplexing systems or demultiplexers provide the converse operation. The resulting signal must contain a special recurrent signal which is called the frame locking signal and which gives the demultiplexer a reference.

b. POSITIVE STUFFING MULTIPLEXING OF PLESIOCHRONOUS SIGNALS

In the case of an asynchronous network the clocks of the component signals are independent, but they are plesiochronous, i.e. they all have the same rated frequency and variations therearound are confined within specified limits. Before time multiplexing can be carried out the component signals must be made synchronous with one another. The usual procedure is to equalize the rates upwards by presenting to each component signal a rate slightly above its nominal rate. The difference between the rates is filled up by additional bits called stuffing bits. The multiplexing resulting from stuffing is called positive stuffing multiplexing.

AND DEMULTIPLEXING

The demultiplexer is also required to recognize and remove the stuffing bits associated with each component signal so as to restore it properly. Accordingly, the stuffing bits, if present, have a definite position in the frame (the frame is the interval separated by two consecutive frame locking signals) and their presence or absence is indicated by the logical value of special (systematically inserted) filling bits called "stuffing indication bits."

If N denotes the number of plesiochronous component signals to be multiplexed, $F_e$ denotes their nominal rate and $F_s > NF_e$ denotes the nominal rate of the resulting signal, then:

$$F_s = NF_e(1 + \epsilon)(1 + \frac{P}{Q}) \quad (1)$$

where Q denotes the number of information bits per frame, P denotes the number of filling bits (frame locking, stuffing indication and, where applicable, service bits) per frame and $F_d = \epsilon F_e$ denotes the nominal stuffing rate.

c. ASSIGNMENT OF MASTER RATES BY NATIONAL TELECOMMUNICATION AUTHORITIES

A digital multiplexer allots to a number of channels at one rate a single channel at a different rate. The rates of the digital channels are defined by national telecommunication authorities and are called master rates; also, some rates are defined internationally. It may and actually does happen that master rates differ in differents countries. Just as an example, it will be assumed that one country has master rates of 8, 34 and 140 Megabits/second whereas another country has 8 and 140 Megabits/second but not 34 Megabits/second.

SUMMARY OF THE INVENTION

This invention relates to a digital multiplexer for multiplexing a number of component signals of a first rate into a single resulting signal of a second rate, the second-rate signal being adapted for demultiplexing, as well as of course into its component signals, into a number of other component signals at a third intermediate rate.

Just to give an example, sixteen 8 Mb/s plesiochronous component signals are multiplexed into a resulting 140Mb/s signal which can be demultiplexed either into sixteen 8 Mb/s signals or into four 34 Mb/s signals as well. Countries where 34 Mb/s is not a master rate and which have formed a 140 Mb/s signal by directly multiplexing a plurality of 8 Mb/s in a multiplexer embodying the invention can transmit the latter signal to 34 Mb/s countries and the latter will be able to demultiplex it into 34 Mb/s signals.

Let us designate by "8 - 34 - 140 Mb/s countries" those countries where 8 Mb/s, 34 Mb/s and 140 Mbs are master rates and "8 - 140 Mb/s countries" those countries where only 8 Mb/s and 140 Mb/s are master rates. It results from the foregoing that bit stuffing is an operation associated to time division multiplexing and has to be used each time the signals to be time division multiplexed originate from unsynchronized sources.

CONSEQUENTLY:

a. In 8-34-140 Mb/s countries, both the 8 Mb/s and the 140 Mb/s signals can originate from unsynchronized sources and have to be bit-stuffed before being time-multiplexed into a 140 Mb/s signal.

b. In 8-140 Mb/s countries, it would be possible to directly stuff and time multiplex the 8 Mb/s signals into a 140 Mb/s signals. But then the resultant signal could not be demultiplexed into 34 Mb/s signals. It would also be possible to conventionally proceed in two levels by first stuffing and time multiplexing the 8 Mb/s signals into 34 Mb/s signals and then stuffing and time multiplexing the 34 Mb/s signals into a 140 Mb/s signal. Of course, in this case, the 34 Mb/s signals all originating from stuffed 8 Mb/s signals would be synchronous and would not have to be completed by stuffing bits. But, in order for the 34 Mb/s to be demultiplexed, they would have to be completed by stuffing indication bits. This two-level process thus comprises two bit stuffing processes and two time division muliplexing processes.

Generally speaking, the bit stuffing operation directed to the intermediary rate signal is omitted and transferred on to the low rate signal which is given a particular treatment.

Accordingly the present invention provides a digital multiplexing and demultiplexing system in which a number of incoming low-rate digital component signals can be time-multiplexed into an outgoing single high-rate digital signal by way of locally formed intermediate-rate digital signals, the intermediate rate being a first multiple of the low rate and the high rate being a second multiple of the intermediate rate, the intermediate rate signals and the high rate signal comprising synchro bits and stuffing bits, the system comprising a first stage for multiplexing the low rate signals into intermediate rate signals, means for stuffing the incoming low rate signals in dependance upon the difference between their own timing and the local timing of the low rate signals in said first multiplexing stage, first means for providing in each of said low rate signals component blank intervals equal in duration to the number of the synchro and stuffing bits in the intermediate rate signals divided by said first multiple, a second stage for multiplexing the intermediate rate signals into the high rate signal, first means for inserting, on the blank intervals of the intermediate rate signals resulting from the multiplexing of the component blank intervals of the low rate signals, the said intermediate rate signal synchro and stuffing bits, second means for providing in each of said intermediate rate signals component blank intervals equal in duration to the number of the synchro and stuffing bits in the high rate signal divided by said second multiple, and second means for inserting, in the blank intervals of the high rate signal resulting from the multiplexing of the component blank intervals of the intermediate rate signals, the said high rate signal synchro and stuffing bits.

Thus, in a system embodying the invention, stuffing of the intermediate-rate signal, instead of being provided as required between the timing of the incoming signal at such rate and the local timing of the multiplexer, is provided systematically at a given stuffing factor. Consequently, operation on the low-rate component signal and the intermediate-rate signal are greatly simplified and can be transferred at the level of the resulting high-rate signal. Inter alia the time bases for the low rate to intermediate rate multiplexing and for the intermediate to high rate multiplexing become just a single time base.

In equation (1), if the input rate $F_e$ is replaced by the intermediate rate $F_i$:

$$F_i = \frac{F_s}{P+Q} \frac{Q}{N} - F_d \quad (2)$$

and if the frame frequency $F_T = F_s/(P + Q)$ is introduced and the stuffing rate $F_d$ is expressed as a percentage of the frame frequency $F_d = xF_T$, then:

$$F_i = F_T \left[\frac{Q}{N} - x\right] \quad (3)$$

For example:
$F_s = 139.264000$ Mb/s
$P + Q = 2928$
$F_T = 47.562$ kHz
$N = 4$
$Q = 2 892$
$x = 5/12$
$F_i = 34.368117$ Mb/s

BRIEF DESCRIPTION OF THE DRAWING

In order that the invention may be readily understood, an embodiment thereof will now be described, by way of example, with reference to the accompanying drawings, in which:

FIGS. 4a, 4b and 4c show respectively a general frame or multiframe of a 140 Mb/s signal and two different kinds of frame which make up the multiframe.

DESCRIPTION OF THE PREFERRED EMBODIMENTS

Figure 1:
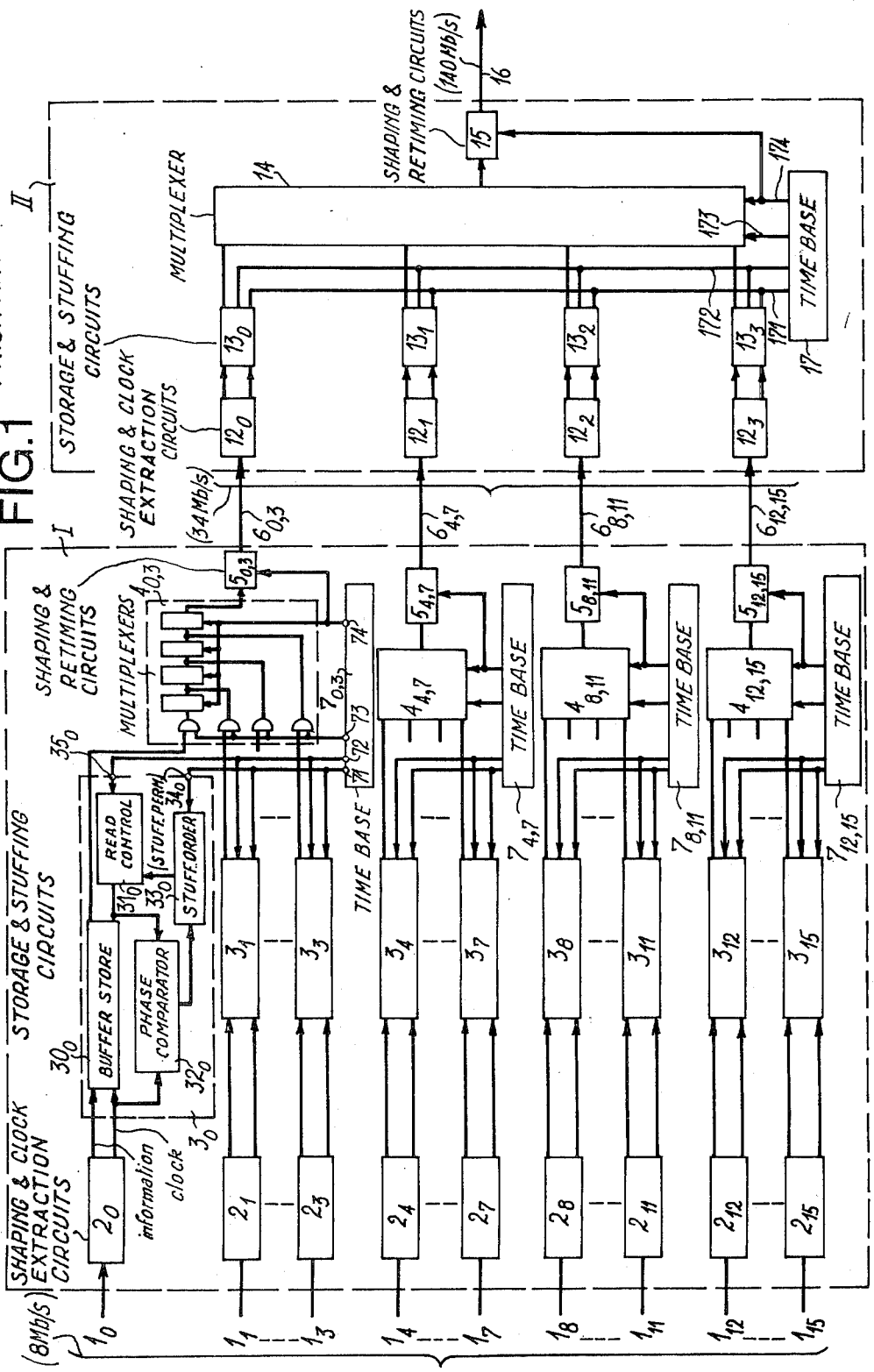
FIG. 1 shows a prior art two-stage digital multiplexer.

Referring to FIG. 1, a prior art digital multiplexer has 16 channels $1_0$ to $1_{15}$ having an 8 Mg/s rate. In a first multiplexing stage I the channels extend to shaping and clock signal extraction circuits $2_0$ to $2_{15}$ respectively each having two outputs, one for the digital information and the other for the clock signal. The circuits $2_0$ to $2_{15}$ will hereinafter be called "input junctors" and can in known manner comprise a binary-HDB 3 transcoder. Each junctor $2_0$ to $2_{15}$ is connected to a respective storage and positive stuffing circuit $3_0$ to $3_{15}$.

Only the circuit $3_0$ is shown in detail in FIG. 1. It comprises a buffer store $30_0$ having a write-in input, connected to the digital-information output of circuit $2_0$, and a write-in progression input connected to the clock signal output of circuit $2_0$. The store $30_0$ can be e.g. a shift register. Store $30_0$ comprises a read output and a read progression input, the latter receiving a signal from a time base $7_{0,3}$ by way of read control circuit $31_0$. The write progression and read progression inputs are connected to a phase comparator $32_0$ whose output is connected to a stuffing order circuit $33_0$, the same being connected to the time base $7_{0,3}$ which via terminal $34_0$ transmits to circuit $33_0$ a stuffing permission signal associated with the frame; circuit $33_0$ is also connected to the reading control circuit $31_0$ which receives a reading control signal from time base $7_{0,3}$ via terminal $35_0$.

The digital information outputs of the storage and positive stuffing circuits $3_0$ to $3_3$ are connected to the inputs of a multiplexer $4_{0,3}$ controlled by time base $7_{0,3}$ and the single output of the multiplexer is connected to the shaping and re-timing circuit $5_{0,3}$. The multiplexers $4_{0,3}$, $4_{4,7}$, $4_{8,11}$ and $4_{12,15}$ are parallel-series converters such as shift registers which receive the low-rate signals for multiplexing in parallel and deliver them in series at a high rate which in the present case is the intermediate rate. Each multiplexer therefore receives from the time base the 8 Mb/s sync signal and the 34 Mb/s sync signal.

At the output of the first multiplexing stage there are the shaping and re-timing circuits $5_{0,3}$, $5_{4,7}$, $5_{8,11}$ and $15_{12,15}$ which will hereinafter be called output junctors. The same in known manner comprise a HDB 3-binary transcoder. Extending from the output junctors are 34 Mb/s digital channels $6_{0,3}$, $6_{4,7}$, $6_{8,11}$ and $6_{12,15}$.

The output digital channels of the first multiplexing stage I are connected to input junctors $12_0$ to $12_3$ of a second multiplexing stage II. The same is very similar to the first stage I except that it multiplexes four digital input channels into a single digital output channel instead of multiplexing four times four channels. In addition to the input junctors $12_0$ to $12_3$ the stage II comprises storage and positive stuffing circuits $13_0$ to $13_3$, a multiplexer 14, an output junctor 15 and a time base 17. Output channel 16 has a rate of 140 Mb/s.

As stated in the introduction, the 8 Mb/s digital channels $1_0$ to $1_{15}$ can be directly multiplexed by sixteen in a single stage and on a single 140 Mb/s output channel. However, this would not comply with the aims of the invention which is to make demultiplexing possible with four signals at 34 Mb/s.

Figure 2:
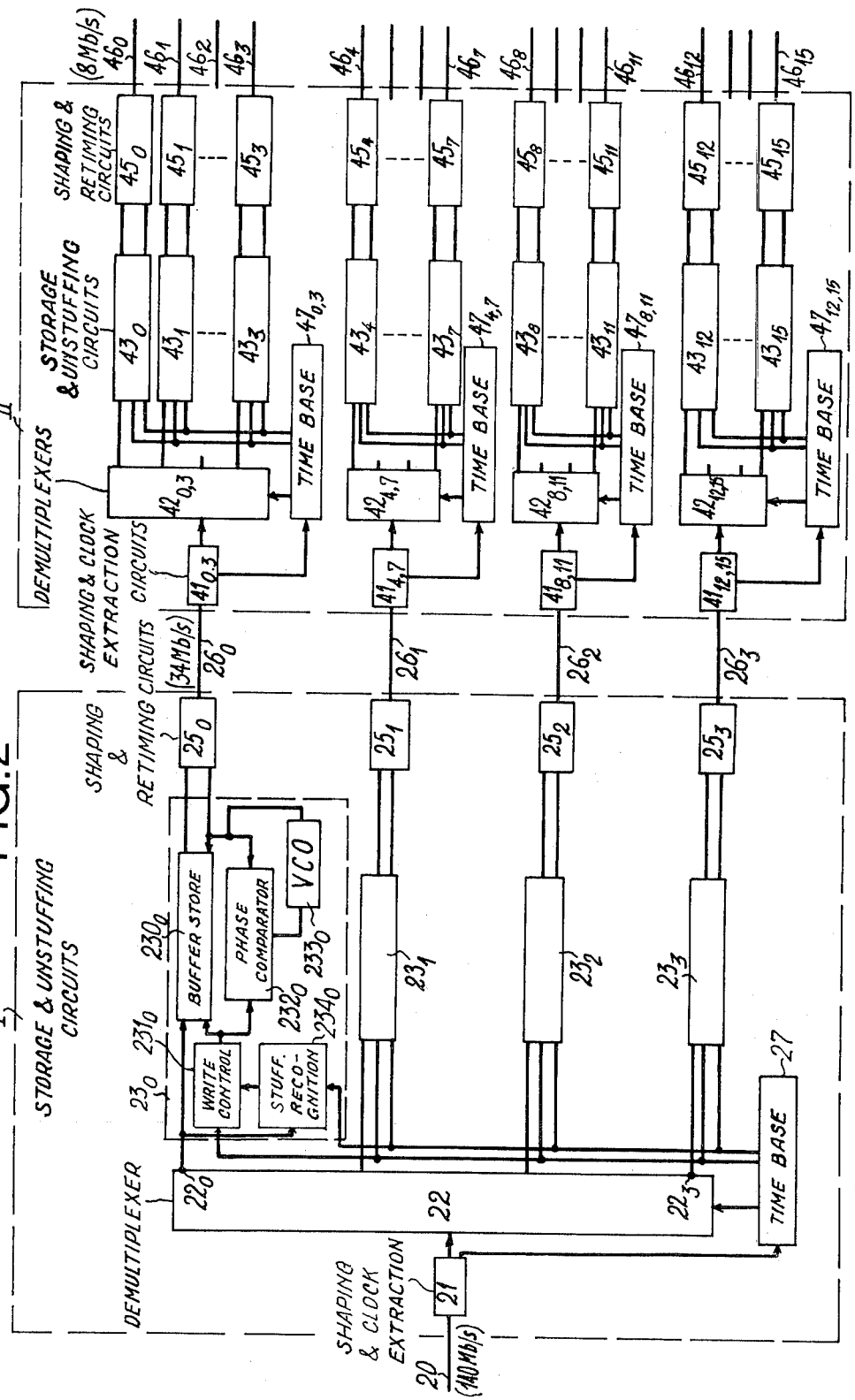
FIG. 2 shows a prior art two-stage digital demultiplexer.

Referring now to FIG. 2, a prior art digital demultiplexer has a 140 Mb/s digital channel 20 which extends in the first demultiplexing stage I' to an input junctor 21 delivering the digital information signal and the timing or clock signal on separate outputs. The information signal is applied to the demultiplexer 22 which has four outputs $22_0$ to $22_3$, and the timing signal goes to a time base 27. Each output of demultiplexer 22 is connected to a respective storage and unstuffing circuit $23_0$ to $23_3$. Only the circuit $23_0$ is shown in detail in FIG. 2, such circuit comprising a buffer store $230_0$ having a write-in input connected to the demultiplexer output $22_0$ and a write-in progression input connected to time base 27 by way of a write-in control circuit $231_0$. The last-mentioned circuit also receives a signal from time base 27 by way of a stuffing recognition circuit $234_0$ which is also connected to the write-in input. The buffer store can have e.g. eight stages. The buffer store $230_0$ comprises a read-out output and a read-out progression input. The write-in and read-out progression inputs are connected to a phase comparator $232_0$ whose output is connected to a circuit $233_0$ comprising a low-pass filter and a voltage-controlled oscillator. The output thereof controls the reading of the buffer store. The write-in control circuit $231_0$ receives a sync signal from time base 27 and a stuffing recognition and position signal from the stuffing recognition circuit.

The digital information outputs of the storage and unstuffing circuits $23_0$ to $23_3$ are connected to output junctors $25_0$ to $25_3$ which receive the 34 Mb/s clock signal from each voltage-controlled oscillator $233_0$ to $233_3$ respectively. 34 Mb/s digital channels $26_0$ to $26_3$ extend from the output junctors.

The digital output channels of the first demultiplexing stage I' are connected to input junctors $41_{0,3}$ to $41_{12,15}$ of the second demultiplexing stage II'. The same is very similar to the first demultiplexing stage I' except that it demultiplexes four digital input channels into sixteen digital output channels instead of demultiplexing a single digital input channel into four digital output channels. In addition to input junctors $41_{0,3}$, $41_{4,7}$, $41_{8,11}$ and $41_{12,15}$, it comprises four demultiplexers $42_{0,3}$, $42_{4,7}$, $42_{8,11}$ and $42_{12,15}$, sixteen storage and unstuffing circuits $43_0$ to $43_{15}$ and sixteen output junctors $45_0$ to $45_{15}$. Output channels $46_0$ to $46_{15}$ of the latter junctors have a rate of 8 Mb/s.

Time bases $47_{0,3}$, $47_{4,7}$, $47_{8,11}$ and $47_{12,15}$ control the demultiplexers and the storage and unstuffing circuits.

Before describing the digital multiplexer and demultiplexer of the system embodying the present invention, a description will be given of the frame of the 34 Mb/s and 14. Mb/s signals to assist understanding of the structure and operation of the multiplexer and demultiplexer embodying the invention.

Figure 3:
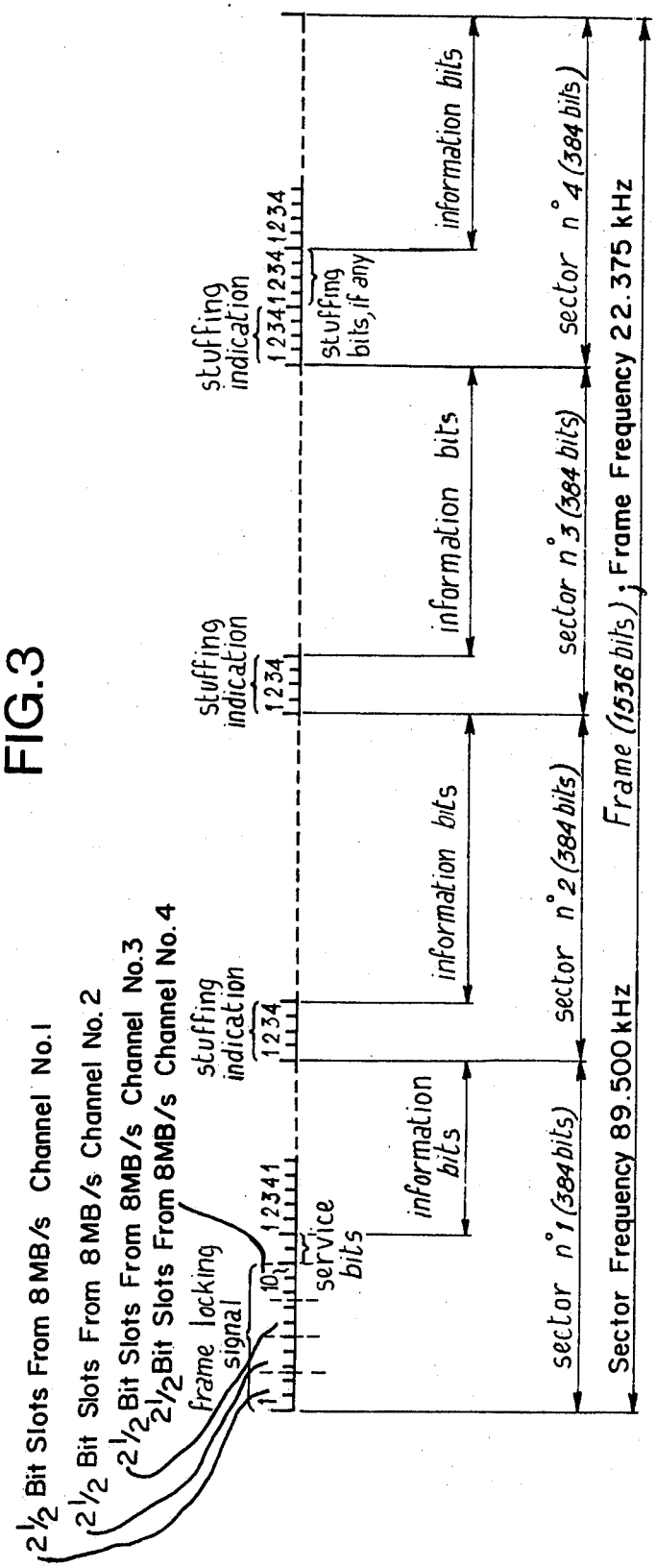
FIG. 3 shows one frame of a 34 Mb/s signal.

FIG. 3 shows the structure of a digital 34 Mb/s signal. The frame comprises four sectors each containing 384 bits, every sector except the first starting with four stuffing indication bits (SIB). The stuffing bits (SB), if any, are in the four bit slots following the stuffing indication bits of the fourth sector. The frame locking signal (exactly 34,816 Mb/s is embodied by the first ten bits of the first sector and is followed by two service bits (SeB). In a frame, the number of information bits originating from the 8 Mb/s signals is Q = 1508, the number of filling bits is P = 24 and the number of stuffing bits is equal to 4. Equation (1) gives by replacing $F_s$ by $F_i$ and by making Fe = 8,435 MHz:

$$F_i \, 4 \times 8.435 \times \frac{1536}{1532} \times \frac{1532}{1508}$$

$F_i$ = 34.368117 Mb/s.

FIG. 4a shows the structure of the 140 Mb/s digital signal. The structure is embodied by a twelve-frame multiframe in which frames Nos. 2, 4, 7, 9, 11 contain systematic stuffing bits and are of the kind shown in FIG. 4b, whereas frames Nos. 1, 3, 5, 6, 8, 10 and 12 do not contain systematic stuffing bits and are of the kind shown in FIG. 4c. The number of bits in a multiframe is:

$$12 \times 2928 = 35,136.$$

FIG. 4b shows a frame which has systematic stuffing. It comprises six sectors each containing 488 bits - i.e. a total of 2928 bits. Each sector except the first starts with 4 stuffing indication bits (SIB) which are bits denoting the presence of stuffing. The first sector starts with a 12-bit frame locking signal (FLS) which is followed by a 4-bit service group (SeB). The final sector comprises systematically 4 stuffing bits (SB).

FIG. 4c shows an unstuffed frame; it is similar to the stuffed frame of FIG. 4b except that the stuffing indication on bits (SIB) are bits denoting the absence of stuffing and the final sector has no stuffing bits (SB). In a multiframe, the number of information bits originating from the 34 Mb/s signal is Q = 34684, the number of filling bits is P = 432 and the number of stuffing bits is equal to 20. Equation (1) gives by making $F_i$ = 34.368117 Mb/s:

$$F_s = 4 \times 34.368117 \times \frac{35136}{35116} \times \frac{35116}{34684}$$

$F_s$ = 139.264000 Mb/s.

Figure 5:
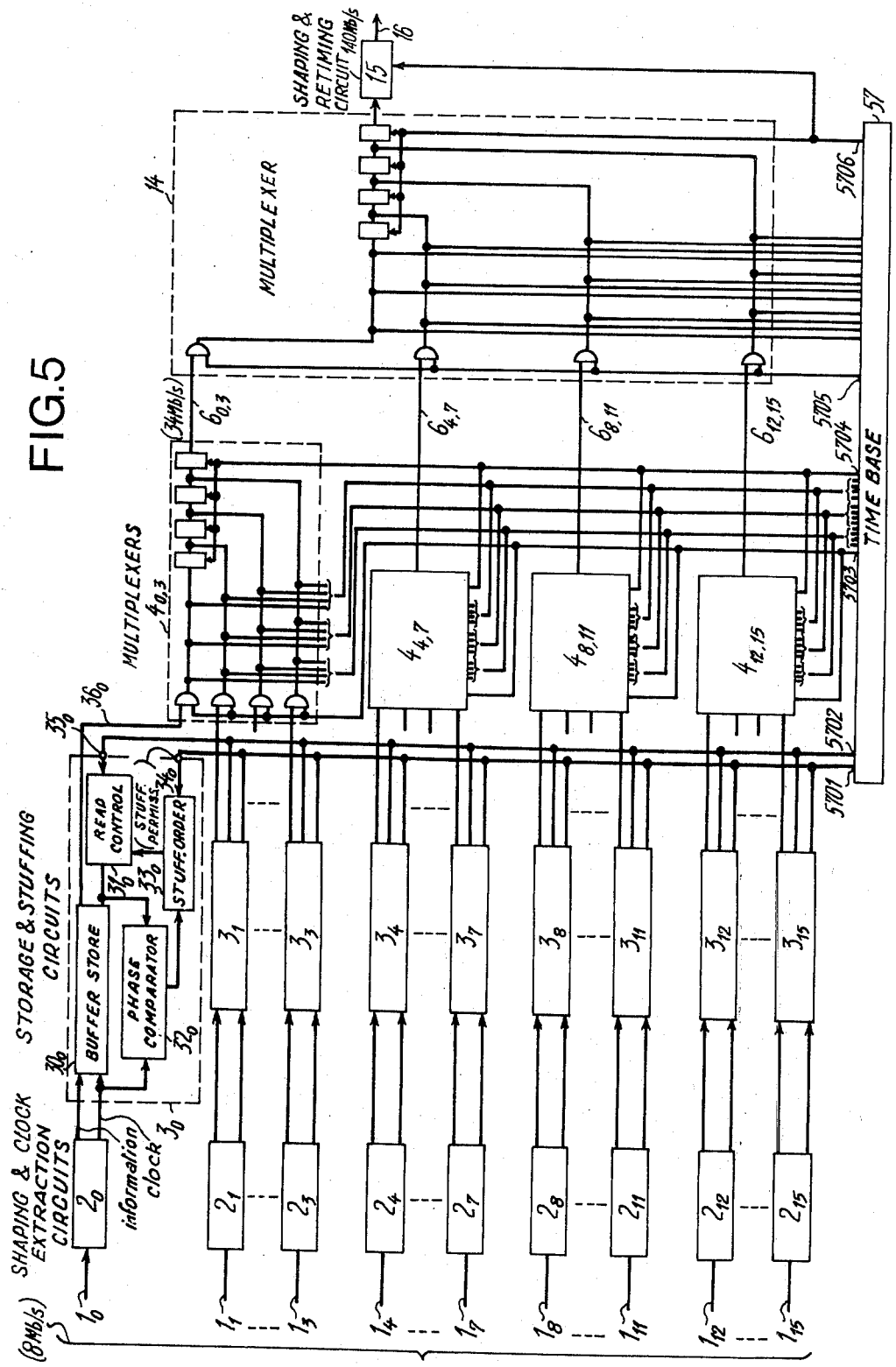
FIG. 5 shows a digital multiplexer embodying the present invention.

Referring to FIG. 5, the multiplexer embodying the present invention is distinguished from the prior art multiplexer by the absence of output junctors $5_{0,3}$, $5_{4,7}$, $5_{8,11}$ and $5_{12,15}$, the absence of input junctors $12_0$, $12_1$, $12_2$ and $12_3$ and the absence of numbering and stuffing circuits $13_0$, $13_1$, $13_2$ and $13_3$. The outputs of the multiplexers $4_{0,3}$, $4_{4,7}$, $4_{8,11}$ and $4_{12,15}$ are directly connected to the inputs of multiplexer 14. Further, the multiplexer embodying the invention has just a single time base 57.

The single time base 57 has to provide the 140 Mb/s multiframe and the 34 Mb/s frames - i.e. it must be adapted for the systematic or non-systematic insertion of the following signals: For the 140 Mb/s multiframe
frame locking signal and service bits (FLS + SeB): 12 + 4 = 16 bits
stuffing indication bits (SIB): 4 "
stuffing bits (SB): 4 " the insertion of all these signals being systematic. For the 34 Mb/s frame
frame locking signal and service bits (FLS + SeB): 10 + 2 = 12 bits
stuffing indication bits (SIB): 4"4 "
stuffing bits (SB): 4 " the first two signals being inserted systematically and the third signal being inserted as required.

According to the principal feature of the invention, stuffing of the 34 Mb/s signals made directly at the level of the 8 Mb/s signals before the multiplexing thereof.

The following table gives the correspondence between the number of holes required in the 8 Mb/s frames for insertion of the required number of bits in the 34 Mb/s frame and between the number of holes required in the 34 Mb/s frames for the insertion of the required number of bits in the 140 Mb/s frame.

|           | Frame at 140 Mb/s | Frame at 34 Mb/s | Frame at 8 Mb/s |
|-----------|-------------------|------------------|-----------------|
| FLS + SeB | 16 = 12 + 4       | 4 = 3 + 1        | 1 = ¾ + ¼       |
| SIB       | 4                 | 1                | ¼               |
| SB        | 4                 | 1                | ¼               |
| FLS + SeB |                   | 12 = 10 + 2      | 3 = 2½ + ½      |
| SIB       |                   | 4                | 1               |
| SB        |                   | 4                | 1               |

Figure 6:
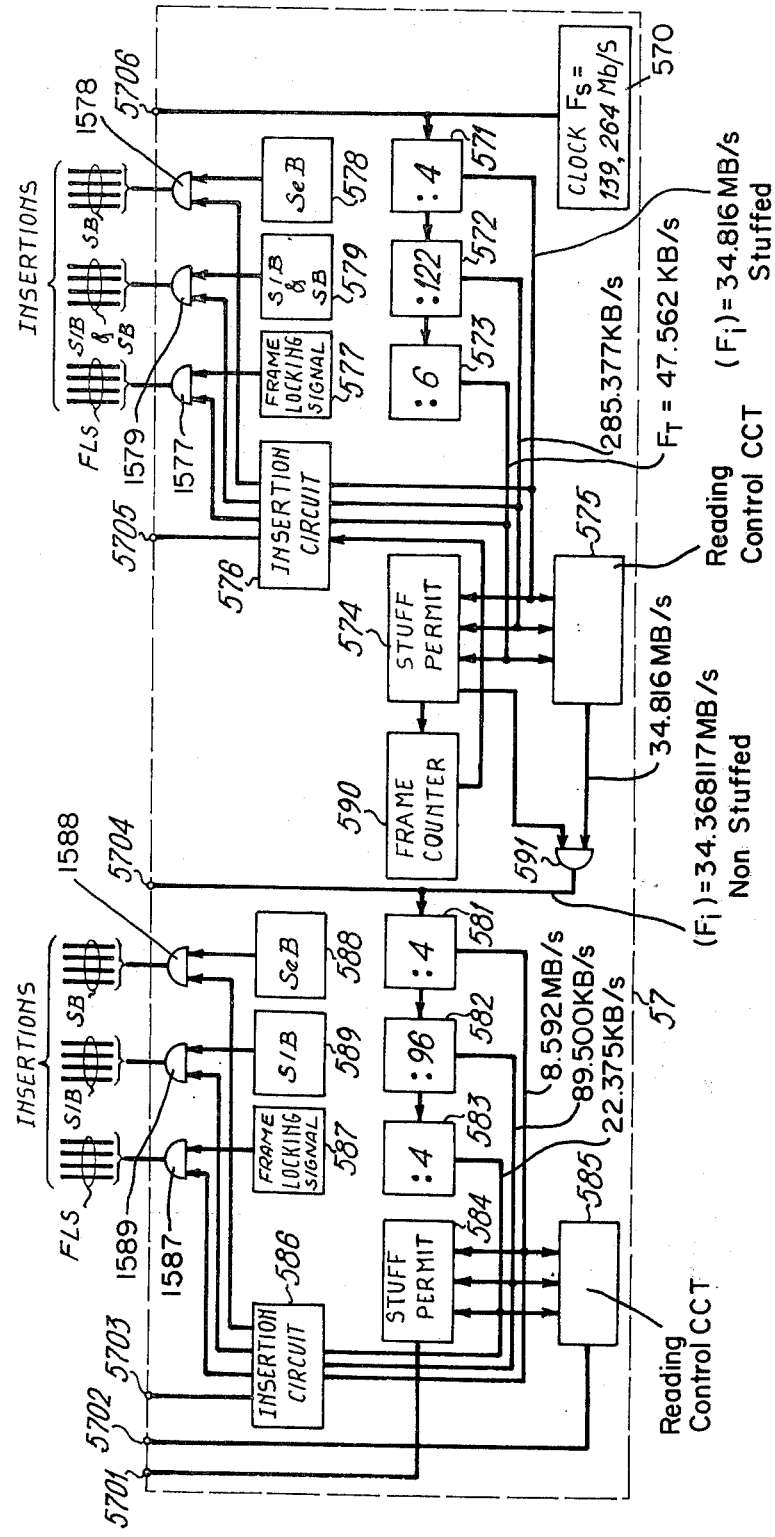
FIG. 6 shows the time base of the multiplexer of FIG. 5.

The single time base 57 is shown in FIG. 6 and comprises a 139.264 MHx clock 570 which generates the clock pulses at the frequency $F_s$ of the resulting signal and two sets of three frequency dividers 571, 572, 573 and 581, 582, 583 respectively assigned to the 8 Mb/s signal stuffing and to the 34 Mb/s signal stuffing. The first frequency divider of each set 571 and 581 is a divider by the number N of multiplexed channels which is equal to 4 in both the low frequency and intermediate frequency cases. The second frequency divider of each set 572 and 582 is a divider by the ratio of the number of bits per sector by the number of multiplexed channels. In the intermediate frequency case, this number is $488/4 = 122$ and in the low frequency case it is $384/4 = 96$. The third frequency divider of each set 573 and 583 is a divider by the number of sectors in the frame, i.e., 6 in the intermediate frequency case and 4 in the low frequency case.

A bit slot address $A_{i,j,k}$ from 1 to 2928 in a frame of FIG. 4b or FIG. 4c is defined by three numbers, namely:

-the number $i$ from 1 to 4 of the component channel from which the bit originates; it is provided by frequency divider 571;

-the number $j$ from 1 to 122 of the originating bit in the component channel; it is provided by frequency divider 572;

-the number $k$ from 1 to 6 of the sector in the frame; it is provided by frequency divider 573.

It can be verified that $$2928 = 4 \times 122 \times 6$$

As all the frames of the multiframe of FIG. 4a are not equivalent, a bit slot address must also comprise the number of the frame. This number f is given by frame counter 590 and the complete address of one of the 35136 bit slots is $A_{i,j,k,f}$.

A bit slot address $B_{l,m,n}$ from 1 to 1536 in the frame of FIG. 3 is defined by three numbers namely:

-the number $l$ from 1 to 4 of the component channel from which the bit originates; it is provided by frequency divider 581;

-the number $m$ from 1 to 96 of the originating bit in the component channel; it is provided by frequency divider 582;

-the number $n$ from 1 to 4 of the sector of the frame; it is provided by frequency divider 583.

It can be verified that $$1536 = 4 \times 96 \times 4.$$

The output signals of the frequency dividers 571–573 are applied to a stuffing permission circuit 574 and to a reading control circuit 575. The output of circuit 574 is connected to the 140 Mb/s frame counter 590 already referred to which controls an AND gate 591. The output of reading control circuit 575 is connected via AND gate 591 to the chain of frequency dividers 581–583. The output signals of frequency dividers 581–583 are applied to a stuffing permission circuit 584 and to a reading control circuit 585. The respective output terminals 5701 and 5702 of the circuits 584 and 585 are connected to the numbering and reading circuits $3_0$ to $3_{15}$. Clearly, therefore, terminals 5701, 5702 of time base 57 are similar to terminals 71, 72 of time base $7_{0,3}$.

Frequency dividers 581–583 are also connected to an insertion circuit 586 which thus receives the address $B_{l,m,n}$ of the 1536 bit-slots of the frame of FIG. 3 When it receives the addresses of the filling bits and the stuffing bits, i.e., the twenty eight addresses 1 to 12, 385 to 389, 769 to 772, 1153 to 1160 (see FIG. 3), insertion circuit 586 opens the AND-gates 1587, 1588 and 1589. Thus it controls the insertion into the 8 Mb/s frames of two-and-a-half bits of the locking signal, half a service bit and three times one stuffing indication bit. These gates are interposed between locking word generator 587, service bits generator 588 and stuffing indication bit generator 589. Circuit 586 also produces at terminal 5703 (similar to terminal 73) inhibiting signals closing the inputs of the parallel-series converter of the multiplexers $4_{0,3}$, $4_{4,7}$, $4_{8,11}$ and $4_{12,15}$, in order to cut the incoming 8 Mb/s signal during insertion of the filling bits. AND gate 591 controlled by stuffing permission circuit 574 transmits the 34.816 MHz signal from the intermediate frequency stage of time base 57 to the low frequency stage of said time base except during insertion of the filling and stuffing bits in the multiframe of FIG. 4a. Thus all the bits of the 34.816 MHz incoming signal are not transmitted through AND-gate 591 and the outgoing signal has a frequency of 34.368117 as explained in the foregoing. The output of AND gate 591 is connected to terminal 5704 which is similar to terminals 74 and at which a 34.368,117 rate signal comprising holes to a whole number of bits appears.

Frequency dividers 571–573 are also connected to an insertion circuit 576 which thus receives the address $A_{i,j,k,f}$ of the 35136 bits slots of the frames of FIGS. 4b and 4c. When it receives the 452 addresses of the filling bits and the stuffing bits, insertion circuit 576 opens the AND-gates 1577, 1578 and 1579. Thus it controls the insertion into the 34 Mb/s frames of 3 locking signal bits, one service bit, one stuffing indication bit and one stuffing bit; such stuffing bit is inserted only in five frames out of every twelve. These gates are disposed between locking word generator 577, service bit generator 578 and stuffing indication and stuffing bit generator 579. Circuit 576 provides at terminal 5705 (similar to terminal 173) the inhibiting signals closing the inputs of the parallel-series converter of the multiplexer 14. The output of time base or clock 570 is connected to terminal 5706 which is similar to terminal 174 and at which a 140 Mb/s signal appears.

As can be gathered from the description of FIG. 6, the places where the filling bits of the 34 Mb/s frame are to be inserted systematically are contrived (with no write-in) during the formation of the 8 Mb/s frame, and the places at which the filling bits of the 140 Mb/s frame are to be inserted systematically are contrived (with no write-in) during the formation of the 34 Mb/s frame. Returning to the example given in the introduction hereof, the mean holed intermediate rate - i.e. the 34 Mb/s rate contriving the positions of the filling bits - is equal - bearing in mind that a 35136 bit multiframe contains $36 \times 12 + 4 \times 5 = 452$ filling bits including the systematic stuffing bit in 5 frames out of twelve-to:

$$F_i = \frac{139.264000}{4} \cdot \frac{35136 - 452}{35136} = 34.368117 \; Mb/s$$

Figure 7:
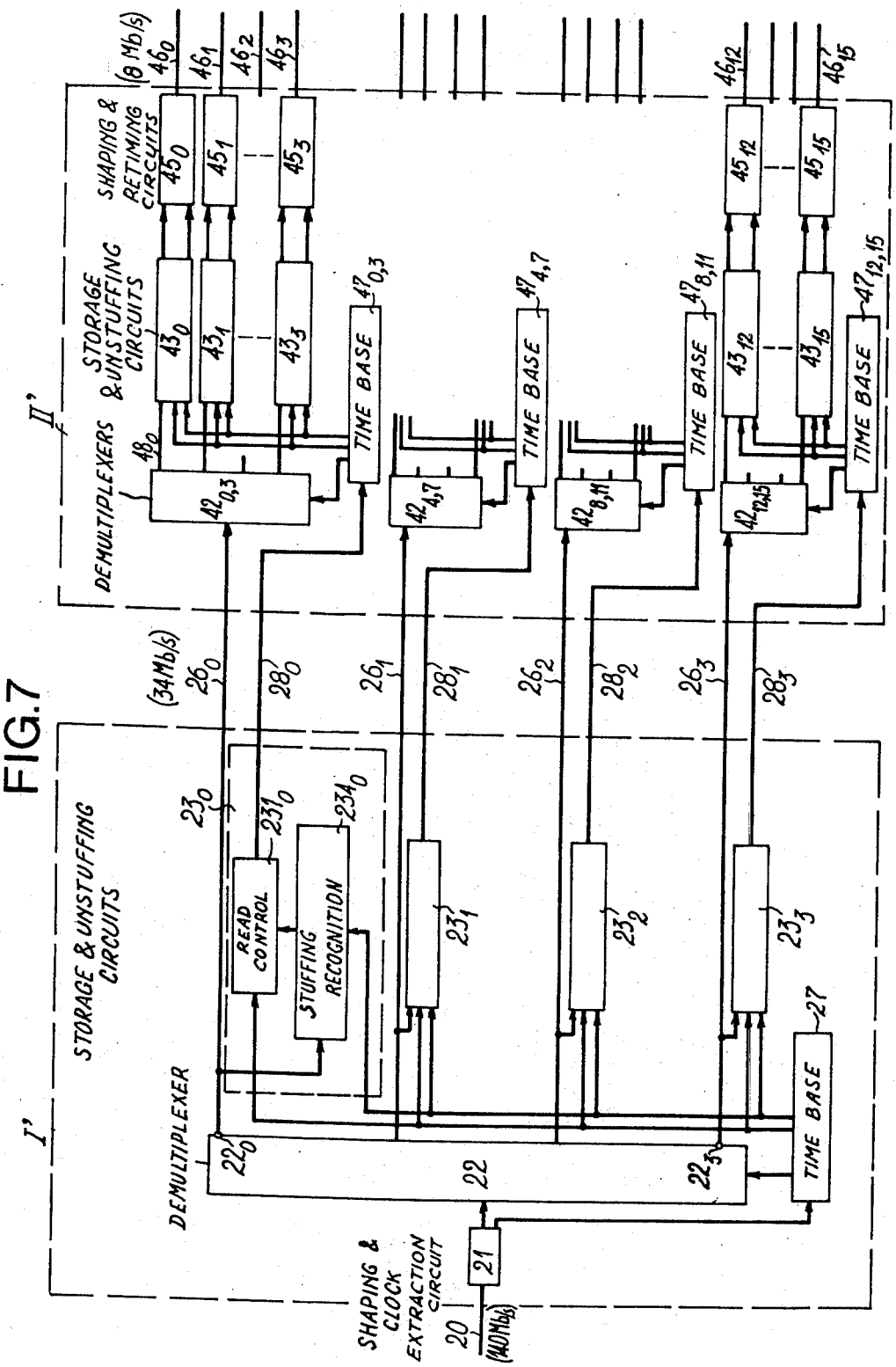
FIG. 7 shows a digital demultiplexer embodying the invention.

FIG. 7 shows the demultiplexer of the system embodying the invention. Whereas the 8 Mb/s signals were plesiochronous and the 34 Mb/s signals were synchronous in the case of the multiplexer, in the case of the demultiplexer the 8 Mb/s signals are plesiochronous and the 34 Mb/s signals can also be plesiochronous since the 140 Mb/s signal may arrive from a country where 34 Mb/s is a master rate. The "140-34" demultiplexing and the "34-8" demultiplexing cannot therefore be controlled by the same time base.

As FIG. 7 shows, there are no output junctors $25_0$ to $25_3$ nor input junctors $41_{0,3}$ to $41_{12,15}$. The storage and unstuffing circuits of the stage I' have no buffer store $230_0$ nor phase comparator $232_0$ nor voltage-controlled oscillator $233_0$. The write-in control circuit $231_0$ does not perform the same function since there is no buffer store, the circuit $231_0$ serving instead to remove the filling bits.

Between stages I' and II' there are, in addition to just four channels $26_0$ to $26_3$ transmitting information bits, four sync channels $28_0$ to $28_3$ transmitting a "holed" 34 Mb/s sync signal.

The signal issuing over a channel as $48_0$ (FIG. 7) of a demultiplexer is compatible with the signal entering via a channel as $36_0$ (FIG. 5) of a multiplexer. The channels $48_0$ and $36_0$ can be directly connected, so that stuffed 8 Mb/s plesiochronous signals and 8 Mb/s signals arising from demultiplexing of a 140 Mb/s signal can be multiplexed into a single multiplex signal without any need for unstuffing and re-stuffing the last-mentioned 8 Mb/s signals.

Although the invention has been described in accordance with a particular embodiment and with reference to specific numerical rates, variants which can readily be devised by the skilled addressee are of course possible and fall within the invention as defined by the appended claims.

What we claim is:

1. A digital multiplexing and demultiplexing system in which a number of incoming asynchronous low rate component signals can be time multiplexed into an outgoing single high rate signal by way of locally formed synchronous intermediate rate signals, the intermediate rate being a first multiple of the low rate and the high rate being a second multiple of the intermediate rate, the low rate signals comprising information bits and the intermediate rate signals and the high rate signal comprising information bits, frame locking bits, stuffing indication bits and stuffing bits arranged in frames, the system comprising:

a. means for stuffing the incoming asynchronous low rate signals in dependance upon the difference between their own originating timing frequencies and a local predetermined timing frequency slightly higher than all said originating timing frequencies;
   b. means for providing in each of said low rate signals a number of component blank bit slots equal to the number of the frame locking, stuffing indication and stuffing bits in the frame of the intermediate rate signals divided by said first multiple;
   c. means for inserting, in said low rate signal component blank bit slots, bits of selected value;
   d. a first stage for multiplexing the low rate stuffed signals having blank bit slots therein and bits of selected value inserted in said slots into the intermediate rate signals whereby the information bits of the low rate stuffed signals are multiplexed into the information bits of said intermediate rate signals and the blank bit slots having bits of selected value inserted therein are multiplexed into the frame locking, stuffing indication and stuffing bits of the intermediate rate signals;
   e. means for providing in each of said intermediate rate signals a number of component blank bit slots equal to the number of the frame locking, stuffing indication and stuffing bits in the frame of the high rate signal divided by said second multiple;
   f. means for inserting, in said intermediate rate signals component blank bit slots, bits of selected value; and
   g. a second stage for multiplexing the intermediate rate signals having blank bit slots therein and bits of selected values inserted in said slots into the high rate signal whereby the information bits of the intermediate rate signals are multiplexed into the information bits of said high rate signal and the blank bit slots having bits of selected value inserted therein are multiplexed into the frame locking, stuffing indication and stuffing bits of the high rate signal.

2. A digital multiplexing and demultiplexing system in which a number of incoming asynchronous low rate component signals can be time multiplexed into an outgoing single high rate signal by way of locally formed synchronous intermediate rate signals, the intermediate rate being a first multiple of the low rate and the high rate being a second multiple of the intermediate rate, the low rate signals comprising information bits and the intermediate rate signals and the high rate signal comprising information bits, frame locking bits, stuffing indication bits and stuffing bits arranged in bits slots and in frames, the system comprising:

a. means for stuffing the incoming asynchronous low rate signals in dependance upon the difference between their own originating timing frequencies and a local predetermined timing frequency slightly higher than all said originating timing frequencies;
   b. first means for defining addresses of the bit slots of the intermediate rate signals containing said frame locking bits, stuffing indication bits and stuffing bits and means, controlled by said first address defining means, for scanning synchronously said low rate signals and said intermediate rate signals;

c. means for providing in the parts of said low rates signals scanned synchronously with the frame locking, stuffing indication and stuffing bits a number of component blank bit slots equal to the number of the frame locking, stuffing indication and stuffing bits in the frame of the intermediate rate signals divided by said first multiple;

d. means for inserting, in said low rate signal component blank bit slots, bits of selected value;

e. a first stage for multiplexing the low rate stuffed signals having blank bit slots therein and bits of selected value inserted in said slots into the intermediate rate signals whereby the information bits of the low rate stuffed signals are multiplexed into the information bits of said intermediate rate signals and the blank bit slots having bits of selected value inserted therein are multiplexed into the frame locking, stuffing indication and stuffing bits of the intermediate rate signals;

f. second means for defining addresses of the bit slots of the high rate signals containing said frame locking bits, stuffing indication bits and stuffing bits and means, controlled by said second address defining means, for scanning synchronously said intermediate rate signals and said high rate signal;

g. means for providing in the parts of said intermediate rate signals scanned synchronously with the frame locking, stuffing indication and stuffing bits a number of component blank bit slots equal to the number of the frame locking, stuffing indication and stuffing bits in the frame of the high rate signal divided by said second multiple;

h. means for inserting, in said intermediate rate signals component blank bit slots, bits of selected value; and i. a second stage for multiplexing the intermediate rate signals having blank bit slots therein and bits of selected values inserted in said slots into the high rate signal whereby the information bits of the intermediate rate signals are multiplexed into the information bits of said high rate signal and the blank bit slots having bits of selected value inserted therein are multiplexed into the frame locking, stuffing indication and stuffing bits of the high rate signal.

* * * * *